Nov. 29, 1927.

M. W. McCONKEY

BRAKE

Filed May 3 1926  3 Sheets-Sheet 1

1,651,142

INVENTOR
Montgomery W. McConkey

Nov. 29, 1927.

M. W. McCONKEY

BRAKE

Filed May 3 1926

INVENTOR

Montgomery W. McConkey

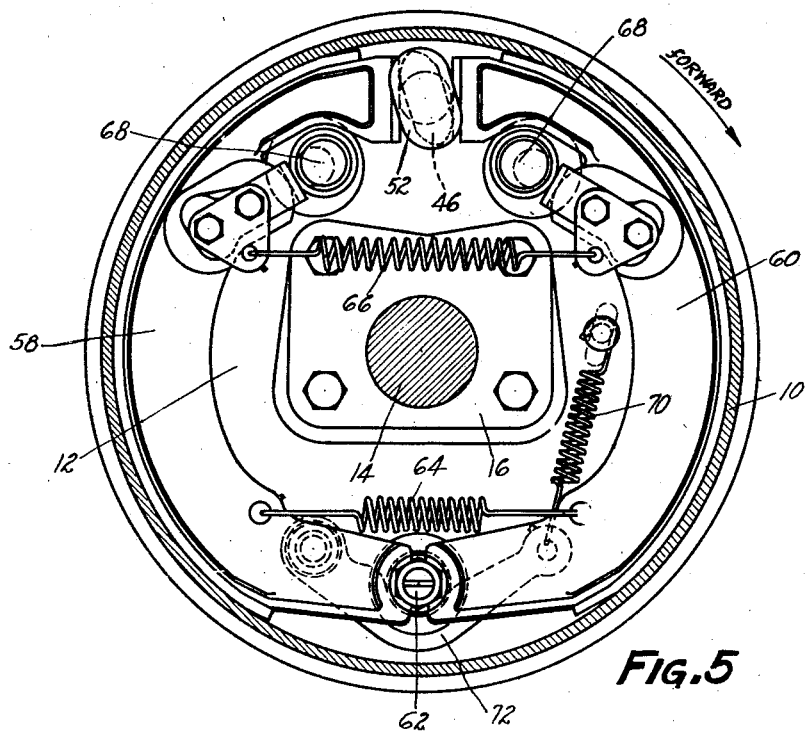
Fig. 5
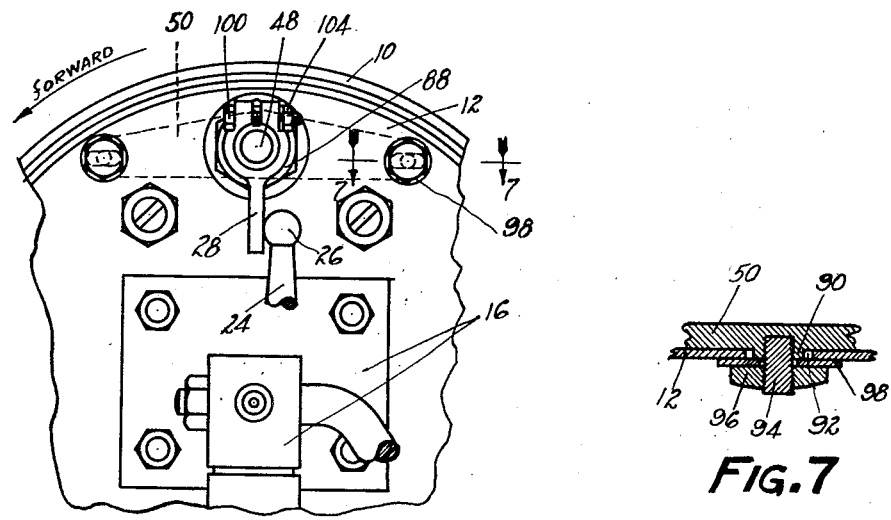
Fig. 6
Fig. 7

Patented Nov. 29, 1927.

1,651,142

UNITED STATES PATENT OFFICE.

MONTGOMERY W. McCONKEY, OF CHICAGO, ILLINOIS, ASSIGNOR TO BENDIX BRAKE COMPANY, OF CHICAGO, ILLINOIS, A CORPORATION OF ILLINOIS.

BRAKE.

Application filed May 3, 1926. Serial No. 106,219.

This invention relates to brakes, and is illustrated as embodied in two internal expanding automobile brakes. An object of the invention is to provide means for preserving, as the brake lining wears, a uniform applying movement of the cam or an equivalent brake-applying device.

In one desirable arrangement, the cam or its equivalent engages a stop which predetermines its idle position, and which is arranged to be adjusted automatically by brake-applying movement in excess of the uniform movement desired. Preferably there is a part, shown integral with the stop, which is engaged and automatically shifted when there is such excess movement.

In the illustrated embodiment, the camshaft of the brake is journalled in a frictionally-held sleeve carried by the shaft bracket, and the sleeve is provided with lugs or other parts on opposite sides of the cam, which parts serve respectively as the stop and as the part which shifts the stop to adjust it.

The above and other objects and features of the invention, including various novel combinations of parts and desirable particular constructions, will be apparent from the following description of the illustrative embodiments shown in the accompanying drawings, in which:

Figure 5 is a vertical section corresponding to Figure 3, but showing a different brake;

Figure 6 is a partial elevation, looking outwardly from inside the wheel toward the backing plate of the brake of Figure 5;

Figure 7 is a detail section on the line 7—7 of Figure 6, showing the means permitting the camshaft bracket to shift;

Figure 1:
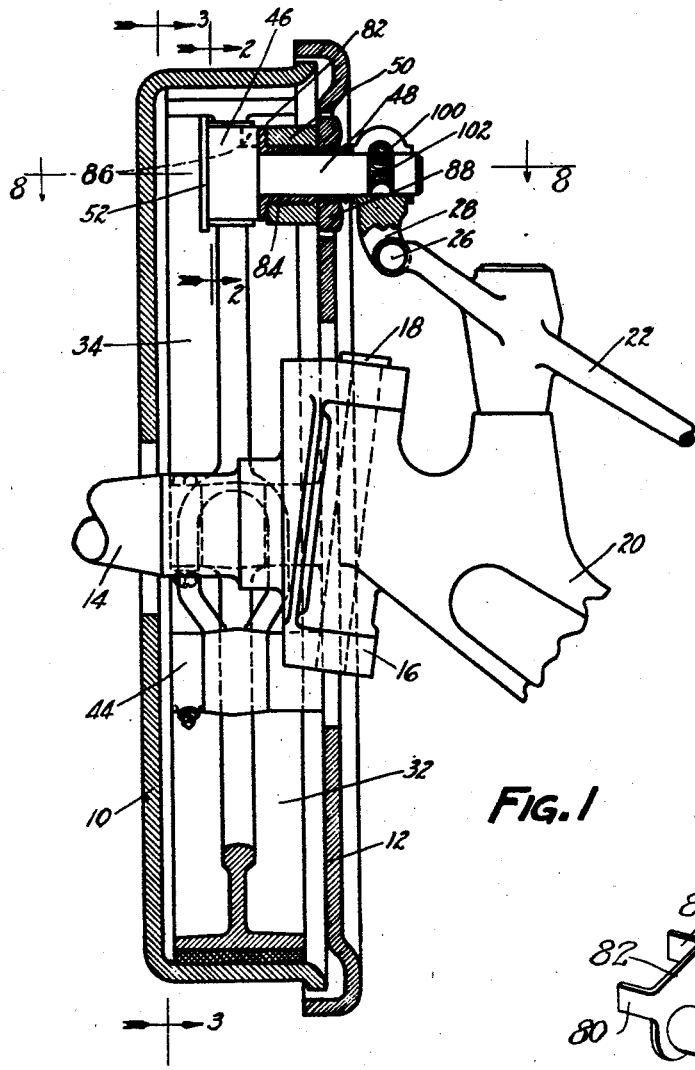
Figure 1 is a vertical section through one front brake and through associated parts.
Figure 9:
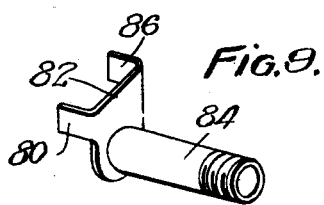
Figure 9 is a perspective of the frictionally-held sleeve.
Figure 2:
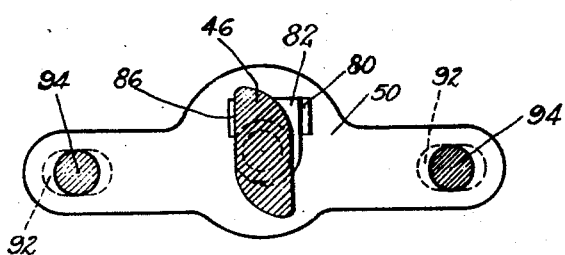
Figure 2 is a section through the cam on the line 2—2 of Figure 1, showing the relation of the cam to the stop device.
Figure 3:
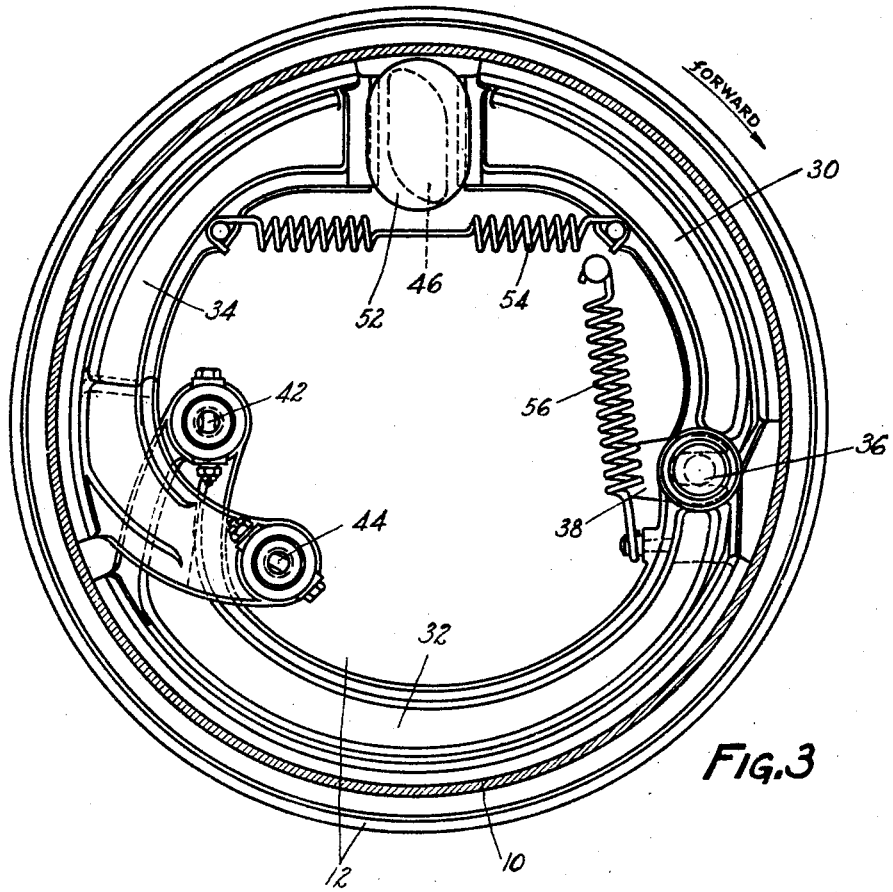
Figure 3 is a vertical section through the brake, on the line 3—3 of Figure 1, showing the shoes in side elevation.
Figure 4:
Figure 4 is a sectional detail, showing a stop for the connected ends of two of the shoes.
Figure 8:
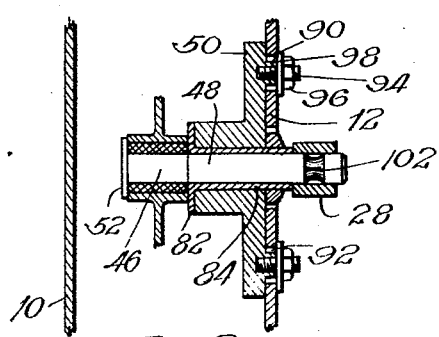
Figure 8 is a section on the line 8—8 of Figure 1, showing the mounting of the brake-applying means.

Each of the brakes includes a drum 10, at the open side of which is arranged a suitable backing plate 12, and within which is arranged the friction means of the brake. Drum 10 is arranged to rotate with a wheel (not shown) mounted on the spindle 14 of a front wheel knuckle 16 swivelled, by a kingpin 18 or the like, at one end of an axle 20. The brake may be applied by means such as a horizontal lever 22 (Figure 1) or 24 (Figure 6), fulcrumed on axle 20 and having a ball end 26 engaging the flattened end of a brake-applying crank arm or lever 28. When the brake is applied, the center of ball 26 is in or immediately adjacent the swivelling axis of the wheel,—i. e. the axis of king-pin 18.

The friction means of the brake of Figures 1–4 includes three shoes 30, 32, and 34. Shoes 30 and 32 are pivotally connected by a pivot pin 36, having a groove in the end next backing plate 12 which is embraced by a fork or jaw in a radially-arranged stop 38 having a stem 40 passing through the backing plate 12 and clamped frictionally thereto by means such as a nut threaded on the end of the stem. The fork or jaw 38 has clearance equal to the desired releasing movement of pin 36, so that the fork serves as a stop determining the idle position of shoe 32 while at the same time as the lining wears it is automatically shifted by the brake-applying movement of pin 36 to adjust its position.

Shoe 32 is anchored on a pivot pin 42 on the backing plate 12, while shoe 34 is anchored on a similar pin 44, shoe 34 having a suitable opening near its anchored end through which the end of shoe 32 passes. The brake is applied by suitable means such as a double cam 46 on a shaft 48 rocked by the arm 28, and supported by a bracket 50, the free ends of shoes 30 and 34 being confined between bracket 50 and a flange 52 on cam 46. The cam forces shoes 30 and 34 apart against the resistance of a return spring 54, whereupon shoe 30 moves about the drum to apply shoe 32 against the resistance of an auxiliary return spring 56.

The brake of Figures 5 and 6 includes a pair of shoes 58 and 60, held against a floating pivot 62 by a spring 64 so that in effect they are pivotally connected, and with their free ends urged by a return spring 66 against adjustable anchors 68. A centering spring 70 is connected to a lever 72 pivoted on the backing plate 12 and having a double wedge surface embracing and tending to center the pivot 62.

The above-described brakes, except as further explained below, form no part of my present invention, which relates to novel means for automatically adjusting a stop for the cam 46, or an equivalent brake-applying member. In the particular embodiment selected for illustration, the stop is in the form of a part or lug 80 on a flange 82 at one end of a sleeve 84 in which shaft 48 is journalled, and which sleeve in turn is journalled in bracket 50. Flange 82 also has another part or lug 86 on the opposite side of the cam. Sleeve 84 is confined between cam 46 and the hub of arm 28, and is threaded at its end for a nut 88 which frictionally clamps it to bracket 50, to resist angular movement of the sleeve in the bracket, nut 88 being received in a relatively large opening in the backing plate. Lugs 80 and 86 are spaced apart by a distance equal to the width of the cam plus the desired predetermined brake-applying movement of the cam.

Bracket 50 has bosses 90 (Figure 7) projecting through slots 92 in the backing plate, and carrying studs 94 threaded to receive nuts 96 clamping washers 98 against the ends of bosses 90, thus embracing backing plate 12 between bracket 50 and washers 98 in a manner permitting the bracket to shift to center cam 46.

In operation, application of the brake will cause cam 46 to engage part 86 after a predetermined movement, to shift sleeve 84 and part 80 (if necessary) against the frictional resistance of nut 88. When the brake is released, cam 46 can only turn back until it engages part 80 again, so that no matter how much the brake lining wears the cam always has a predetermined movement limited by the relative positions of parts 80 and 86, and fixed by their distance apart (i. e. by the amount by which their distance apart exceeds the width of the cam).

As the lining wears, arm 28 may be adjusted angularly of shaft 48, to preserve its relation to the swivelling axis of the wheel, by turning a clamping bolt 100 in the split hub meshing with worm teeth 102 cut in shaft 48, after which tightening up a nut 104 on the bolt serves to prevent turning of the bolt at the same time that it contracts the split hub onto the shaft.

While a particular construction has been described in detail, it is not my intention to limit the scope of the invention to that particular construction, or otherwise than by the terms of the appended claims.

I claim:

1. A brake comprising, in combination, a brake-applying device, a stop determining the idle position of said device, and means operated by the application of the brake for shifting the stop automatically to maintain a uniform distance of brake-applying movement of said device as the brake wears.

2. A brake comprising, in combination, a brake-applying device, and means determining the idle position of said device arranged to be operated by the application of the brake automatically to maintain a uniform distance of brake-applying movement of said device as the brake wears.

3. A brake comprising, in combination, friction means, an applying device for said means including a shaft, a stop limiting the return movement of the shaft when the brake is released, and means for shifting the stop as the friction means wears to preserve a predetermined release movement of the shaft.

4. A brake comprising, in combination, friction means, an applying device for said means including a shaft, a stop limiting the return movement of the shaft when the brake is released, and means operated by movement of the shaft in applying the brake for shifting the stop as the friction means wears to preserve a predetermined release movement of the shaft.

5. A brake comprising, in combination, friction means, a cam for applying the friction means, a stop determining the idle position of the cam, and means for shifting the stop as the friction means wears to preserve a predetermined release of the cam.

6. A brake comprising, in combination, friction means, a cam for applying the friction means, a stop determining the idle position of the cam, and means operated by engagement with the cam in applying the brake for shifting the stop as the friction means wears to preserve a predetermined release movement of the cam.

7. A brake comprising, in combination, a brake-applying cam, and a frictionally-held device having parts on opposite sides of the cam and allowing a predetermined movement of the cam before shifting, one of said parts serving as a stop to predetermine the idle position of said cam and the other engaged by excessive movement of the cam to shift the stop part.

8. A brake comprising, in combination, an angularly-movable brake-applying member, and a frictionally-held device having parts on opposite sides of said member and allowing a predetermined movement of the member before shifting, one of said parts serving as a stop to predetermine the idle position of said member and the other engaged by excessive movement of the member to shift the stop part.

9. A brake comprising, in combination, a drum, a backing plate at the open side of the drum, friction means between the drum and backing plate, an applying device for said means within the drum, a stop within the drum determining the position of the applying device when the brake is released and a part operated by applying movement of the device to shift the stop to preserve a uniform release movement of said device as the friction means wears, and means accessible from outside the backing plate for frictionally clamping the stop and said part.

10. A brake comprising, in combination, a drum, a backing plate at the open side of the drum, friction means between the drum and backing plate, an applying device for said means within the drum, a shaft for said device extending through the backing plate, a stop within the drum determining the position of the applying device when the brake is released, and a part operated by applying movement of the device to shift the stop to preserve a uniform release movement of said device as the friction means wears, and means accessible from outside the backing plate adjacent the shaft for frictionally clamping the stop and said part.

11. A brake comprising, in combination, a drum, a backing plate at the open side of the drum, friction means between the drum and backing plate, an applying device for said means within the drum, a shaft for said device extending through the backing plate, a stop within the drum determining the position of the applying device when the brake is released, and a part operated by aplying movement of the device to shift the stop to preserve a uniform release movement of said device as the friction means wears, and a sleeve surrounding the shaft and carrying the stop and said part.

12. A brake comprising, in combination, a drum, a backing plate at the open side of the drum, friction means between the drum and backing plate, an applying device for said means within the drum, a shaft for said device extending through the backing plate, a stop within the drum determining the position of the applying device when the brake is released, and a part operated by applying movement of the device to shift the stop to preserve a uniform release movement of said device as the friction means wears, a sleeve surrounding the shaft and carrying the stop and said part, and means for frictionally clamping the sleeve against movement.

13. A sleeve to surround a brake camshaft, having a thread at one end for a clamping nut, and having at its other end two lugs spaced apart a distance greater than the width of the brake cam by an amount equal to the desired release movement of the cam.

14. A sleeve to surround a brake camshaft, having a thread at one end for a clamping nut, and having at its other end a flange perpendicular to the sleeve axis and formed with two lugs projecting on opposite sides of a cam on the camshaft and spaced apart a distance greater than the width of the cam by an amount equal to the desired release movement of the cam.

15. A brake-operating device including a bracket, a sleeve journalled in the bracket and having a pair of angularly-spaced lugs at one end, a camshaft journalled in the sleeve and having a cam received between said lugs, and means frictionally resisting shifting of the sleeve.

16. A brake-operating device including a bracket, a sleeve journalled in the bracket and having a pair of angularly-spaced lugs at one end, a camshaft journalled in the sleeve and having a cam received between said lugs, and means frictionally clamping the sleeve to the bracket.

17. A brake-operating device including a bracket, a sleeve projecting through the bracket and threaded at one end and formed with angularly-spaced lugs at the other end, a nut threaded on the sleeve against the bracket and resisting angular movement of the sleeve, a shaft journalled in the sleeve, and a brake-applying member arranged between said lugs and operated by the shaft.

18. A brake-operating device including a bracket, a sleeve projecting through the bracket and threaded at one end and formed with angularly-spaced lugs at the other end, a nut threaded on the sleeve against the bracket and resisting angular movement of the sleeve, a shaft journalled in the sleeve, a brake-applying member on one end of the shaft arranged between said lugs and operated by the shaft, and an operating arm on the other end of the shaft beyond the end of the sleeve.

19. A brake-operating device including a bracket, a sleeve projecting through the bracket and threaded at one end and formed with angularly-spaced lugs at the other end, a nut threaded on the sleeve against the bracket and resisting angular movement of the sleeve, a shaft journalled in the sleeve, a brake-applying member on one end of the shaft arranged between said lugs and operated by the shaft, an operating arm on the other end of the shaft beyond the end of the sleeve, and means for adjusting the arm angularly of the shaft.

20. A brake comprising, in combination, friction means having adjacent separable ends, an applying device engaging said ends, a bracket supporting the applying device, means engaging the bracket in a manner resisting shifting with respect to the bracket and including a part serving as a stop to predetermine the idle position of the applying device and another part operated by applying the brake to adjust the stop part, and means supporting the bracket in a manner permitting it to shift to center the brake-applying device automatically with respect to the friction means.

In testimony whereof, I have hereunto signed my name.

MONTGOMERY W. McCONKEY.